US005613105A

United States Patent [19]
Zbikowski et al.

[11] Patent Number: 5,613,105
[45] Date of Patent: Mar. 18, 1997

[54] EFFICIENT STORAGE OF OBJECTS IN A FILE SYSTEM

[75] Inventors: Mark Zbikowski, Woodinville; Brian T. Berkowitz, Bellevue; Robert I. Ferguson, Seattle, all of Wash.

[73] Assignee: Microsoft Corporation, Redmond, Wash.

[21] Appl. No.: 86,344

[22] Filed: Jun. 30, 1993

[51] Int. Cl.$^6$ .......................... G06F 17/30; G06F 12/04
[52] U.S. Cl. .................. 395/611; 395/401; 395/427
[58] Field of Search .................. 395/600, 425, 395/575, 700, 275, 400

[56] References Cited

U.S. PATENT DOCUMENTS

| | | | |
|---|---|---|---|
| 4,606,002 | 8/1986 | Waisman et al. | 395/600 |
| 4,611,272 | 9/1986 | Lomet | 395/600 |
| 4,677,550 | 6/1987 | Ferguson | 395/600 |
| 4,761,737 | 8/1988 | Duvall et al. | 395/400 |
| 4,935,825 | 6/1990 | Worrell et al. | 360/54 |
| 4,953,122 | 8/1990 | Williams | 395/400 |
| 5,029,125 | 6/1991 | Sciupac | 395/600 |
| 5,034,914 | 7/1991 | Osterlund | 395/425 |
| 5,040,110 | 8/1991 | Miki et al. | 395/600 |
| 5,043,967 | 8/1991 | Gregg et al. | 395/425 |
| 5,058,002 | 10/1991 | Nakamura et al. | 395/600 |
| 5,081,608 | 1/1992 | Tamura et al. | 395/600 |
| 5,125,086 | 6/1992 | Perazzoli, Jr. | 395/425 |
| 5,129,088 | 7/1992 | Auslander et al. | 395/700 |
| 5,202,986 | 4/1993 | Nickel | 395/600 |
| 5,204,958 | 4/1993 | Cheng et al. | 395/600 |
| 5,206,939 | 4/1993 | Yanai et al. | 395/400 |
| 5,218,696 | 6/1993 | Baird et al. | 395/600 |
| 5,237,675 | 8/1993 | Hannon, Jr. | 395/425 |
| 5,247,658 | 9/1993 | Barrett et al. | 395/600 |
| 5,261,088 | 11/1993 | Baird et al. | 395/600 |
| 5,265,244 | 11/1993 | Ghosh et al. | 395/600 |
| 5,371,885 | 12/1994 | Letwin | 395/600 |

FOREIGN PATENT DOCUMENTS

0488700A2  6/1992  European Pat. Off. .......... G06F 3/06

OTHER PUBLICATIONS

Atkinson et al.; "Using C"; QUE, 1990; pp. 415–503.
"Multi–Table Search For B–Tree Files," *IBM Technical Disclosure Bulletin* 22(6):2565–2570, Nov. 1979.
"Order–Preserving Hashing Using Positional Character Transition Frequencies," *IBM Technical Disclosure Bulletin* 29(12):5256–5260, May 1987.
"File & Data Base Techniques", James Bradley, Published 1981, pp. 123–147.
"Database System Concepts", Henry F. Korth & Abraham Silberschatz, Published 1986, pp. 275–282.
"An Introduction to Operating Systems", Harvey M. Deitel, Published 1983, pp. 155–171.
W. Richard Stevens, *Advanced Programming in the UNIX Environment*, pp. 56–60, 92–95 and 99–101 (1993).

*Primary Examiner*—Thomas G. Black
*Assistant Examiner*—Cheryl Lewis
*Attorney, Agent, or Firm*—Seed and Berry LLP

[57] ABSTRACT

A file system provides a hierarchical approach to storage of file data. Logically contiguous bytes of file data are stored in stream data structures, and streams which hold related file data are stored in a variable sized onode data structures on disk. The variable-sized onode data structures are stored in fixed sized buckets, and the buckets are organized into a variable sized array. Thus, the file system provides a combination of variable-sized storage with fixed-sized storage to provide a very efficient approach to storing file data. In addition, indexes may be provided within the structures to allow quick access to onodes and streams.

30 Claims, 10 Drawing Sheets

EFFICIENT STORAGE OF OBJECTS IN A FILE SYSTEM

TECHNICAL FIELD

The present invention relates generally to data processing systems and, more particularly, to efficient storage of objects in a file system.

BACKGROUND OF THE INVENTION

In conventional operating systems, each file is allocated a fixed number of blocks of disk space for storing file data as well as control information about the file. The blocks are fixed-sized so that the blocks may be quickly allocated and deallocated. The control information for the files and the file data are often variable-sized, which poses at least two problems. First, when the control information and/or file data is not large enough to fill a block, disk space within the block is wasted. Second, when the control information and/or file data is too large to be stored in a single block, it must be stored in multiple blocks and multiple pointers are maintained to specify where the data is stored. Maintaining and using such pointers is often quite cumbersome.

SUMMARY OF THE INVENTION

In accordance with a first aspect of the present invention, a method and system are practiced for storing file data in secondary storage having memory space. The data processing system for practicing this method includes the secondary storage as well as internal storage. At least a portion of the memory space in the secondary storage is logically partitioned into fixed-sized data structures. A first set of logically related file data of a first size is stored in a variable-sized data structure of a given type. The variable-sized data structure which stores the first set of logically related file data is stored in at least one fixed-sized data structure in the secondary storage. Additional sets of logically related file data may be stored in the same fixed-sized data structures in the secondary storage.

In accordance with another aspect of the present invention, logically contiguous bytes of file data are stored in variable-sized data structures of a first type and sets of the variable-sized data structures of the first type that store related file data are stored in variable-sized data structures of a second type. The variable-sized data structures of the second type, in turn, are stored in fixed-sized data structures in secondary storage.

In accordance with yet another aspect of the present invention, a method is practiced in a data processing system having secondary storage. In this method, sets of logically contiguous bytes of file data are stored in respective variable-sized data structures of a first type. Selected ones of the variable-sized data structures of the first type are stored in variable-sized data structures of a second type in the secondary storage. A B-tree index to the variable-sized data structures of the first type are stored in the variable-sized data structures of the second type in the secondary storage. A separate B-tree index may be maintained for each of the variable-sized data structures of the second type which are held in the data processing system.

In accordance with a still further aspect of the present invention, a method is practiced in a data processing system that includes secondary storage. The secondary storage includes memory space which holds an array of fixed-sized buckets. One of the buckets of the array holds an object. The method allocates additional memory space in the secondary storage to fulfill growing requirements of the object. First, it is determined whether the bucket that currently holds the object has sufficient free memory space to fulfill the growing requirements of the object. If the bucket has sufficient free memory space, additional space in the bucket is allocated to the object to fulfill the growing requirements of the object. Otherwise, a bucket is found that has sufficient memory space to fulfill the growing requirements of the object. The object is then moved to the located bucket.

In accordance with an additional aspect of the present invention, files are stored in an array of fixed-sized buckets of storage space in the secondary storage. At least one of the fixed-sized buckets of storage space has more than one file stored in it. An identifier is provided for each file to identify the file amongst those stored in the array. A map is also stored in the secondary storage to map each identifier for a file into the fixed-sized bucket in which it is stored. One of the files having a selected identifier is located in the array by using the map to locate the fixed-sized bucket in which the file is stored and then searching the fixed-sized bucket to locate a file having the selected identifier.

In accordance with another aspect of the present invention, files are stored in an array of fixed-sized buckets of storage space in the secondary storage. Each file has an identifier associated with it. A mapping structure of multiple entries is stored in the secondary storage. The entries in the mapping structure include at least one entry that maps one of the identifiers to one of the buckets in the array. A free list of identifiers of free cells of the space in the secondary storage is stored in the mapping structure. The free list includes identifiers of those cells that have not yet been allocated. The mapping structure is used to locate a bucket from the identifier of the bucket. Moreover, the mapping structure may be used to locate a free cell from an identifier for the free cell.

In accordance with still another aspect of the present invention, an array of fixed-sized buckets of storage space in the secondary storage is also provided for storing files. Each file has an identifier associated with it. A mapping structure of multiple entries is provided in the secondary storage. A free list is provided in the mapping structure in secondary storage. The free list includes identifiers of any free cells of space in the secondary storage. The mapping structure maps identifiers to either cells in the free list or buckets in the array. A determination is made whether the free list contains an identifier of at least one cell. Where the free list does contain an identifier for at least one cell, a selected identifier of one of the cells of the free list is assigned to a new file and the new file is stored in the cell. Where the free list contains no identifiers, additional entries may be added to the mapping structure that map new identifiers to new associated free cells. One of the new identifiers associated with one of the new free cells may be assigned to the new file and the new file may be stored in the new free cell.

DETAILED DESCRIPTION OF THE INVENTION

The preferred embodiment of the present invention provides an efficient strategy for storing file data on disk. The strategy is described in detail below.

Figure 1:
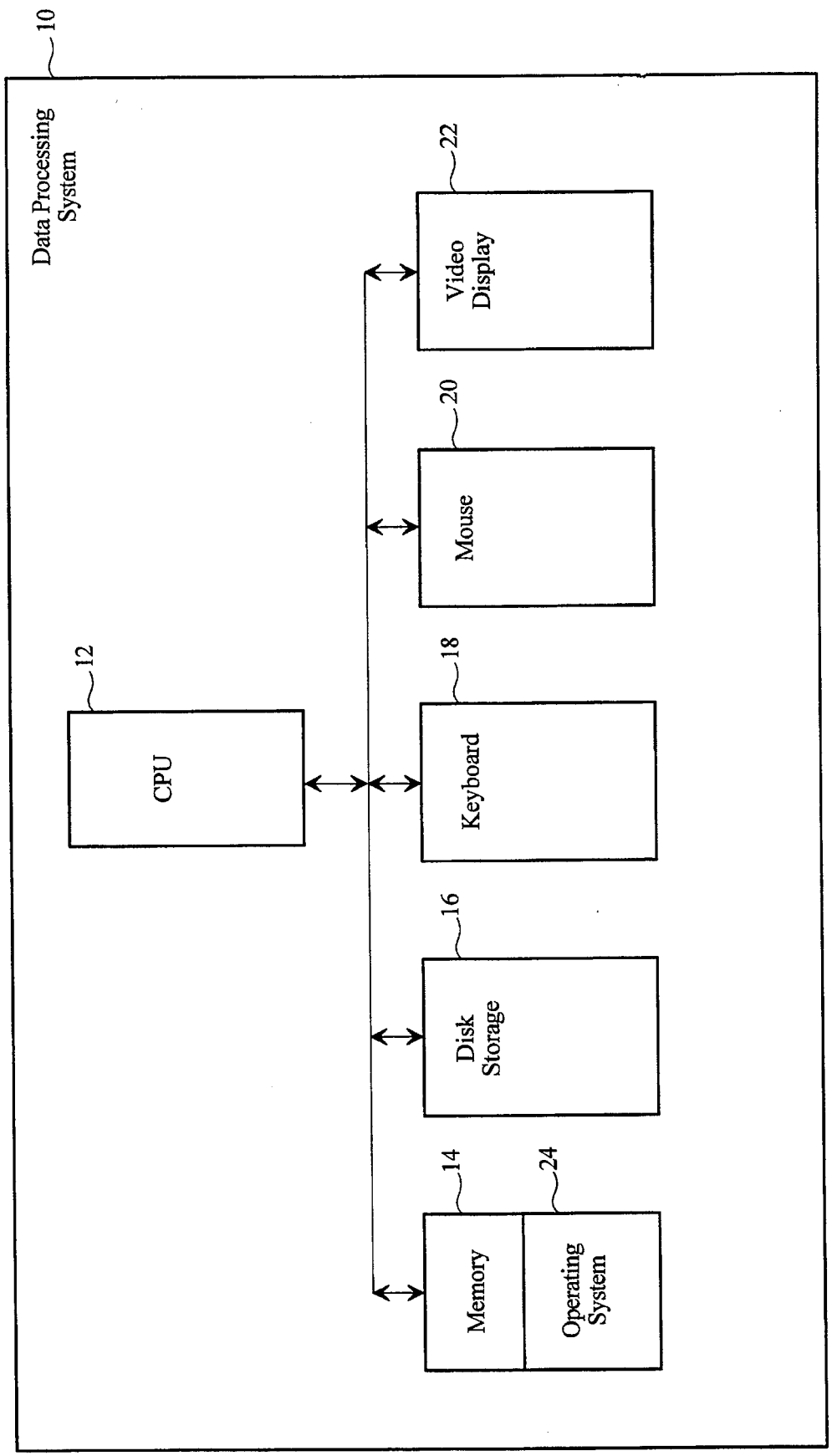
FIG. 1 is a block diagram of a data processing system that is suitable for practicing a preferred embodiment of the present invention.

FIG. 1 is a block diagram of a data processing system 10 for practicing the preferred embodiment of the present invention. The data processing system 10 includes a central processing unit (CPU) 12, a memory 14 and disk storage 16. In addition, the data processing system 10 includes a keyboard 18, a mouse 20 and a video display 22. The memory 14 holds a copy of an operating system 24. The operating system 24 provides the file system management services that will be described in more detail below. Although the data processing system 10 described herein is a single processor system, those skilled in the art will appreciate that the present invention may also be implemented in a multiple processor system, such as a distributed system. Furthermore, although the preferred embodiment of the present invention is described as being part of the operating system 24, those skilled in the art will appreciate that the present invention may alternatively be implemented in a graphical user interface or in other types of code that are separate from the operating system.

The file system management services of the operating system 24 are responsible for storing file data on disk in the disk storage 16. The operating system 24 of the preferred embodiment is an object-oriented operating system. As such, the operating system 24 supports the notion of an object.

The smallest unit of storage on a disk in disk storage 16 is a "stream". A stream is a logically contiguous, randomly addressable group of bytes of file data. A suitable format for a stream descriptor is described co-pending patent application Ser. No. 08/085,543, now abandoned, entitled "Storage of File Data on Disk in Multiple Representations", which was filed on even date herewith and assigned to a common assignee. The disclosure of this co-pending application is explicitly incorporated by reference herein.

Figure 2:
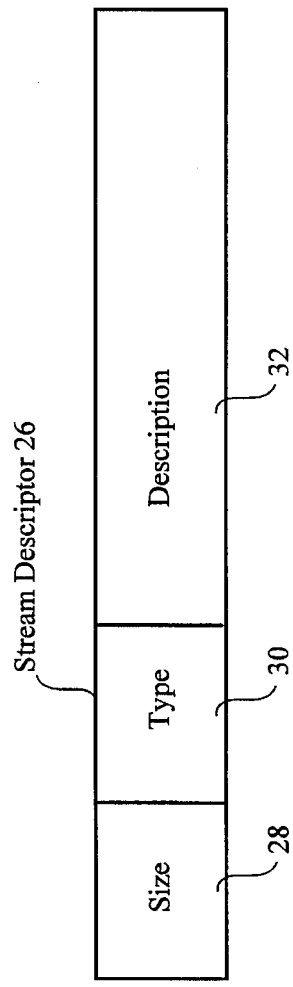
FIG. 2 is a diagram illustrating the format of a stream descriptor for the preferred embodiment of the present invention.

Each stream has a stream descriptor 26 associated with it. The stream descriptor 26 describes the stream and provides a means for accessing the data held within the stream. As shown in FIG. 2, the stream descriptor 26 has as least three fields: a size field 28, a type field 30 and a description field 32. The size field 28 holds a value specifying the number of bytes in the stream. The type field 30 holds the type of stream described by the descriptor 26. Lastly, the description field 32 holds a description of the stream. The description held in the description field 32 may be an immediate representation of the data of the stream or may alternatively point to extents of memory space that hold data of the stream.

Figure 3:
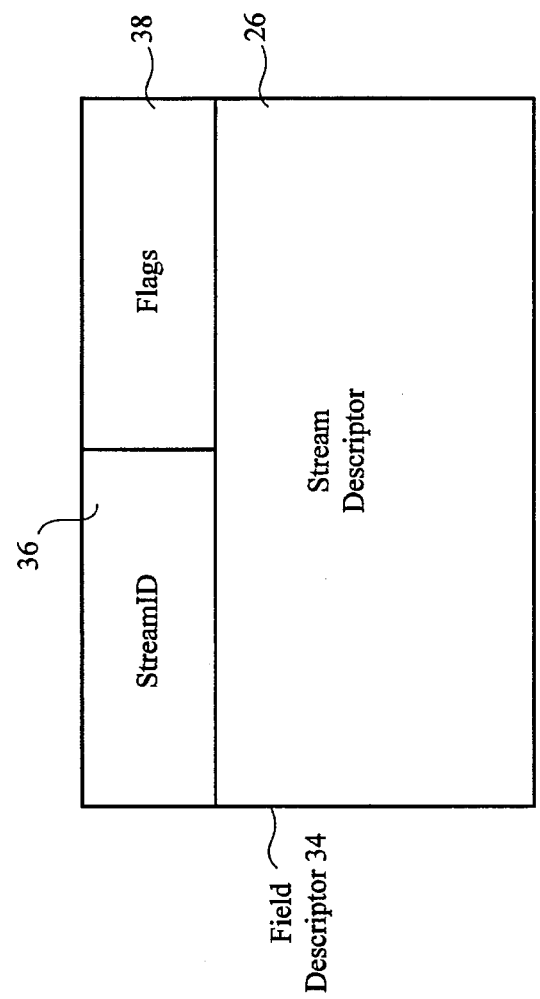
FIG. 3 is a diagram illustrating the format of a field descriptor for the preferred embodiment of the present invention.

The preferred embodiment of the present invention stores information about streams in a field descriptor 34 like that shown in FIG. 3. The field descriptor 34 includes a stream ID field 36 that holds a stream ID. The stream ID is a four-byte long identification number that uniquely identifies the stream within an onode (onodes will be described in more detail below). The field descriptor 34 further includes flags field 38 that holds flag bits. The final field of the field descriptor 34 is the stream descriptor 26 for the stream.

Streams are grouped according to related functionality into "onodes". An onode corresponds with the logical notion of an object and typically holds all of the streams that constitute a file, a directory or a sub-directory. Each onode includes information necessary to describe the variable-sized collection of streams that it includes.

Figure 4:
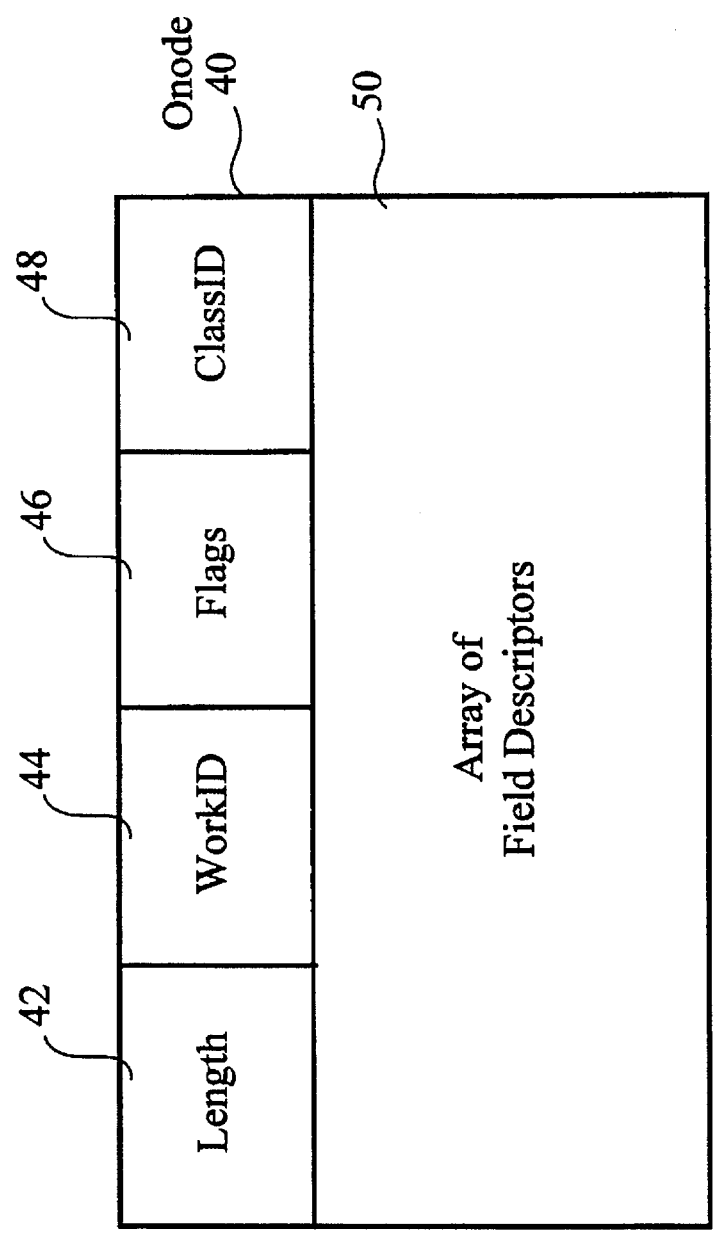
FIG. 4 is a diagram illustrating the format of an onode for the preferred embodiment of the present invention.

FIG. 4 is a diagram that describes the format of an onode 40. Each onode holds streams of related functionality. Each onode 40 includes the following fields: a length field 42, a work ID field 44, a flags field 46, a class ID field 48, and a field 50 that holds an array of field descriptors 34 (such as depicted in FIG. 3). The length field 42 holds a value that specifies the length of the onode, whereas the work ID field 44 holds an index into a work ID mapping array 74 (FIG. 7), as will be described in more detail below. The work ID is four bytes in length. The flags field 46 (FIG. 4) holds flag bits, and the class ID field 48 holds a class ID for the onode. Field 50 holds a packed array of field descriptors, that includes a field descriptor 34 for each of the streams held with the onode 40. The number of streams included in the array of field descriptors of field 50 may vary. Moreover, the length of each stream in the array of field descriptors of field 50 may vary. Accordingly, the onode 40 is a variable-size structure. The variable-size nature of onodes 40 helps to minimize internal fragmentation in allocation units on disk in disk storage 16.

Figure 5:
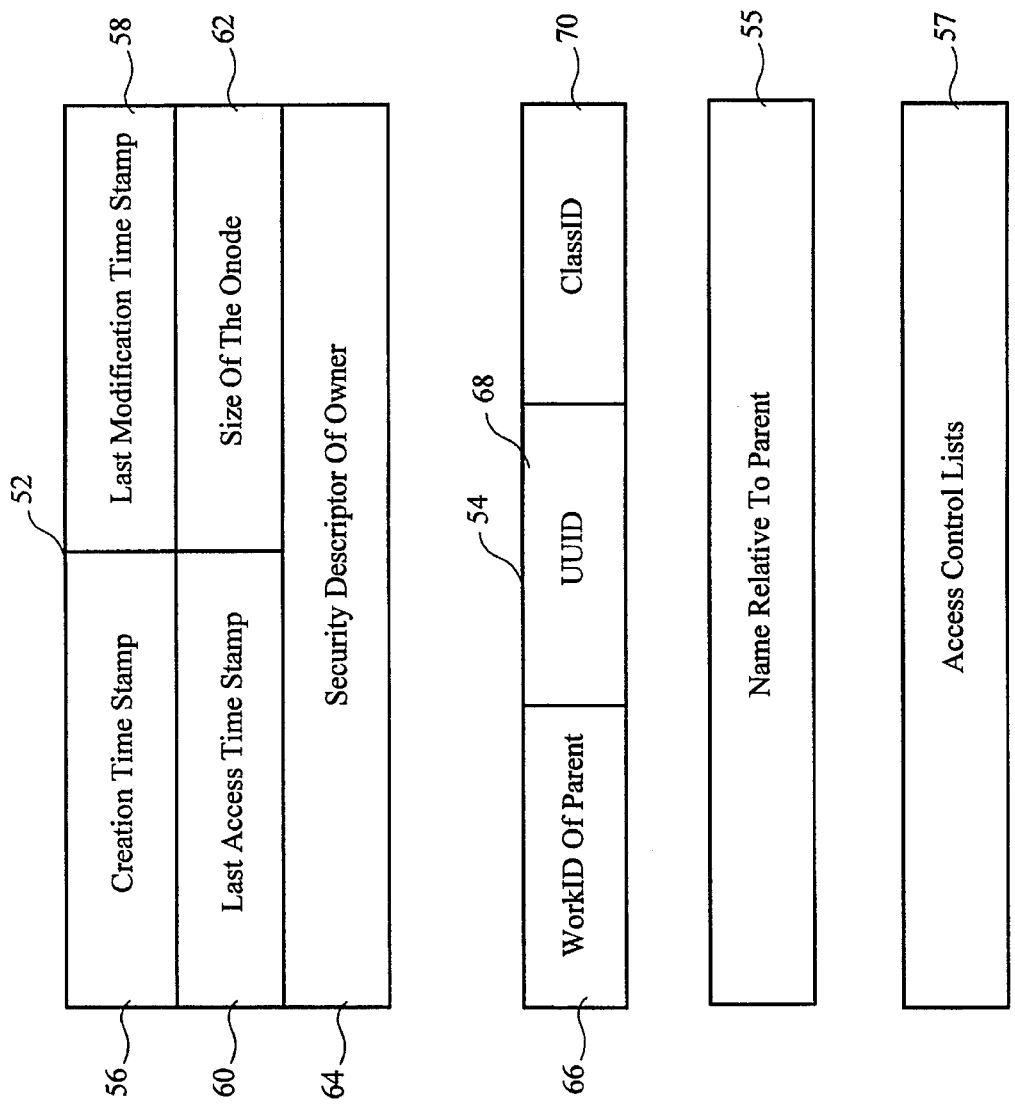
FIG. 5 is a diagram illustrating streams that hold property information about the onode of FIG. 4.

Certain data about onodes 40 is not incorporated directly into the onode. Instead, this data is stored in separate streams as shown in FIG. 5, if it is stored at all for an onode. Stream 52 holds a number of different types of status information regarding its associated onode 40 (FIG. 4). The status information includes a time stamp held in field 56 that specifies the time that the onode 40 was created. Field 58 holds a time stamp that specifies the last time that the onode 40 was modified. Similarly, field 60 holds a time stamp that specifies the last time that the onode 40 was accessed. Field 62 holds a value that specifies the size of the onode 40, and field 64 holds a security descriptor for the owner of the onode. All of the information held in stream 52 is useful in administration of file data held in the associated onode 40.

A second stream 54 of status information is also shown in FIG. 4. This stream 54 includes three fields 66, 68 and 70. Field 66 holds the work ID of the parent onode of the current onode. Specifically, each onode 40 is visible in the global name space of the data processing system 10, and the global name space is a logical tree structure in which each onode other than the root onode is a child of another onode. Field 66 holds the work ID of the parent onode. Field 68 holds a Universally Unique ID (UUID) for the onode 40. This UUID is unique among entities in the global name space of the system. Lastly, field 70 holds a class ID that specifies the class of the onode 40. Each onode 40 has a unique class associated with it. In particular, each onode 40 is an instance of an object of a particular class.

Two additional streams 55 and 57 of status information may also be stored. Stream 55 (when present) holds the name of the onode 40 relative to its parent, and stream 57 (when present) holds access control lists (used in security) for the onode.

Streams 52, 54, 55 an 57 are stored separately for at least two reasons. First, storing this information separately helps to reduce the average size of the onodes 40. Streams 52, 54, 55 and 57 are not stored for each onode. As a result, the average size of an onode decreases. The separation of the information that may not be included for some onodes into streams 52, 54, 55 and 57 is a convenient representation. Second, storing this data separately allows programmatic access to related groups of information without requiring complex code to retrieve the code from each onode 40.

Figure 6:
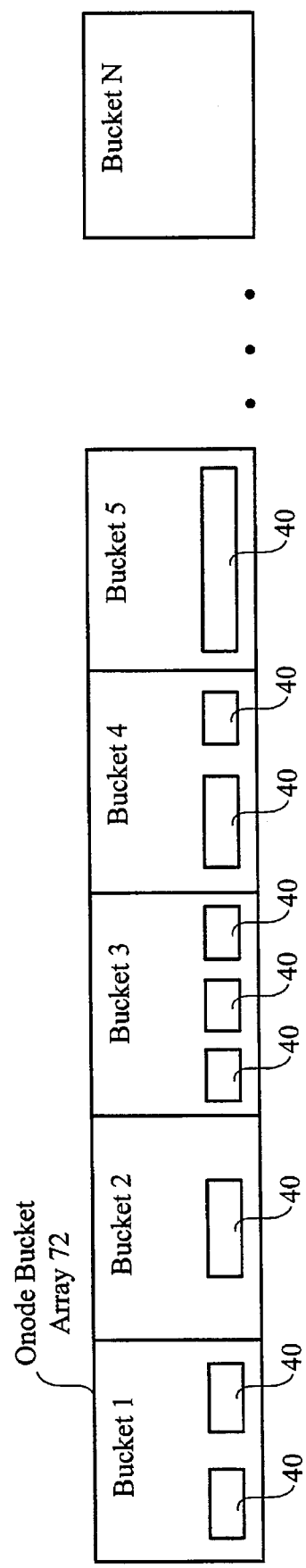
FIG. 6 is a diagram of a bucket array for the preferred embodiment of the present invention.

The onodes 40 (FIG. 4) are stored in onode bucket arrays 72 (FIG. 6). The onode bucket array 72 is a variable-sized data structure that is made up of an array of fixed-sized buckets. The size of the buckets (e.g., 4K) depends on the architecture of the data processing system 10 but may match the page size of the system 10. The buckets are numbered 1 through N in the example of FIG. 6. Each bucket in the array 72 contains a packed set of onodes 40. In the example of FIG. 6, it can be seen that bucket 2 includes only a single onode, whereas bucket 1 includes two onodes and bucket 3 includes three onodes.

The onode bucket array 72 is used to minimize the amount of data that must be shuffled when file data is moved, deleted or inserted. The granularity of allocation and deallocation of blocks of disk space is fixed. In other words, memory blocks are allocated and deallocated in fixed sized buckets. If, instead, a variable-sized structure was employed for storing file data, the granularity of allocation would not be fixed, and the granularity of allocation could become excessively large. Similarly, if buckets were large, the amount of time spent in compaction would be large.

For efficiency, the operating system 24 FIG. 1) stores related onodes 40 (FIG. 4) in the same buckets in the array 72 (FIG. 6) or in buckets that are in close proximity to each other on disk in disk storage 16. This storage strategy minimizes seek time in finding onodes 40 on disk. In general, files that are typically accessed together are placed into the same bucket. Examples of files that are accessed together include files in a common sub-directory or directory.

Figure 7A:
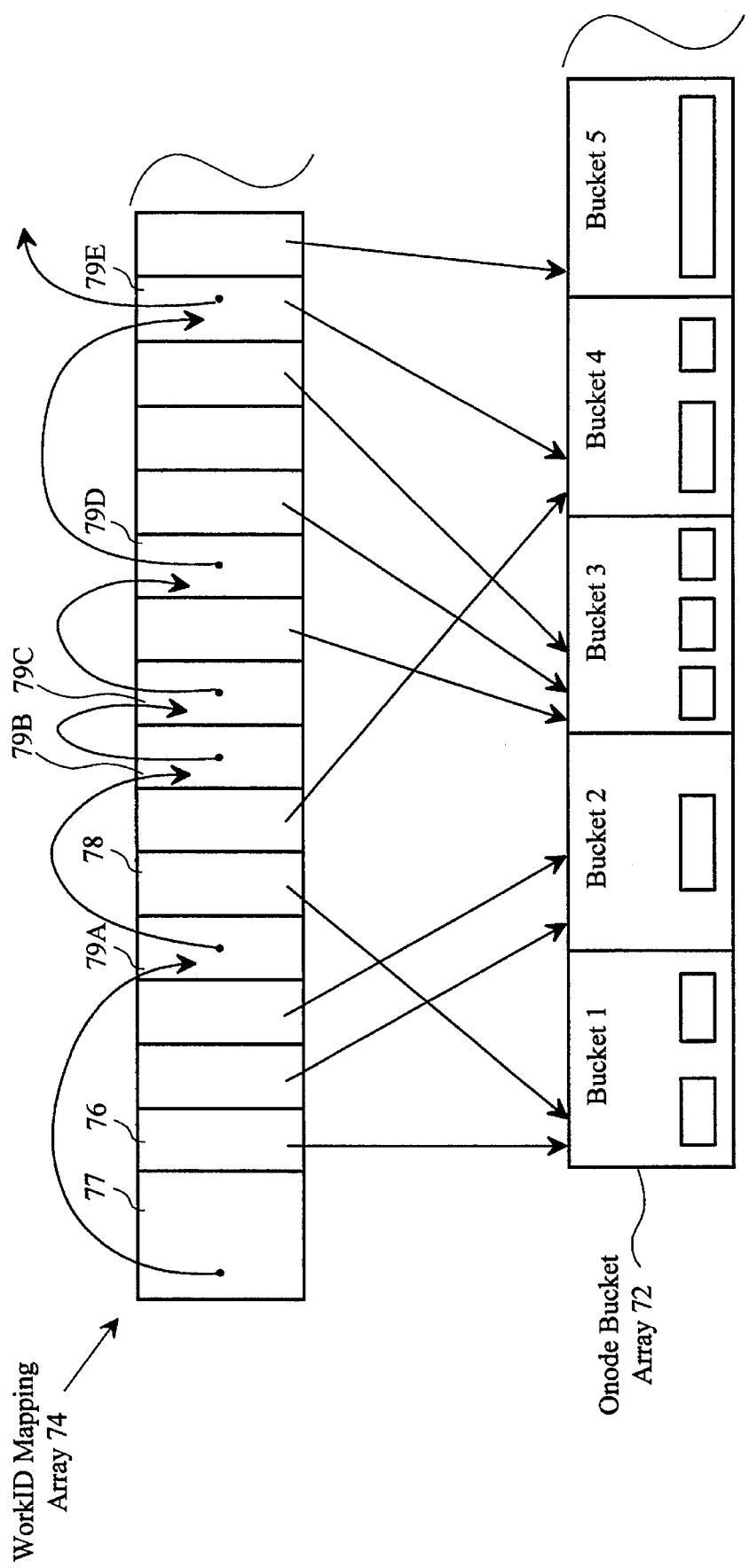
FIG. 7A is a diagram of a work ID mapping array and an onode bucket array for the preferred embodiment of the present invention.

The onode bucket array 72 (FIG. 6) is accessed as a stream. Locating an onode 40 (FIG. 4) within the bucket of the array 72 requires looking for a work ID for the onode. Internally, all references between onodes are based on work IDs. The work ID mapping array 74 (FIG. 7A) maps from a work ID to a bucket number of the onode bucket array 72. In particular, the work ID of a particular onode 40 serves an index into the work ID mapping array 74. The entry at the specified index identifies the bucket number that holds the onode 40. For example, as shown in FIG. 7A, entries 76 and 78 of the work ID mapping array 74 hold values specifying that the onodes 40 having the associated work IDs are held in bucket 1.

The work ID mapping array 74 includes a header 77. The header includes some scratch memory space and a pointer to the head of a free list. The free list is threaded into the work ID mapping array 74. It includes work IDs that have not yet been allocated for the disk storage 16. Specifically, the pointer in the header 77 points to an entry 79A in the work ID mapping array that has the work ID of the next free work ID in the free list. In this example, entries 79A, 79B, 79C, 79D and 79E each include work IDs for next consecutive work IDs on the free list. A last entry may be included that has a distinguished value indicating the end of the free list. The work IDs encode whether a work ID is on the free list or not. In particular, the high order bit of each work ID specifies whether the work ID corresponds to an allocated bucket in the onode bucket array 72 or corresponds with the next free entry in the free list. Thus, as shown in FIG. 7A, the work ID mapping array 74 may include entries that hold the work ID for buckets in the onode bucket array 72 as well as work IDs for the free list.

Figure 7B:
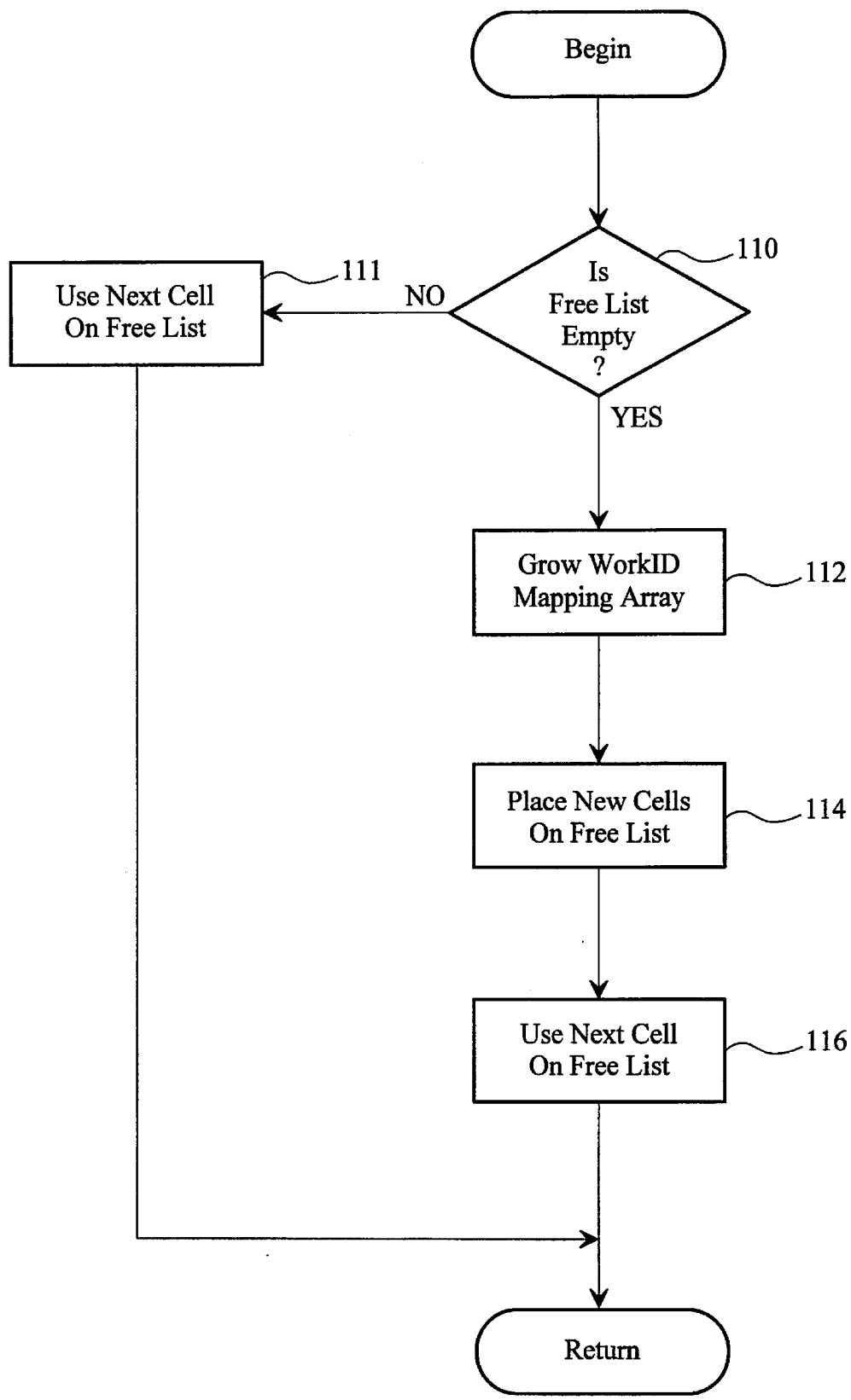
FIG. 7B is a flow chart illustrating the steps performed by the preferred embodiment of the present invention to allocate a new work ID.

In order to allocate a new work ID on the work ID mapping array 74, the steps shown in FIG. 7B are performed. First, the free list is examined to determine if it is empty (step 110). If the free list is not empty, the next work ID on the free list is used (step 111). If, however, the free list is empty, the work ID mapping array 74 is grown to include additional work IDs associated with new cells (step 112). The new cells are placed onto the free list (step 114). At this point, the free list is no longer empty, and the first work ID of the free list is used (step 116).

Figure 8A:
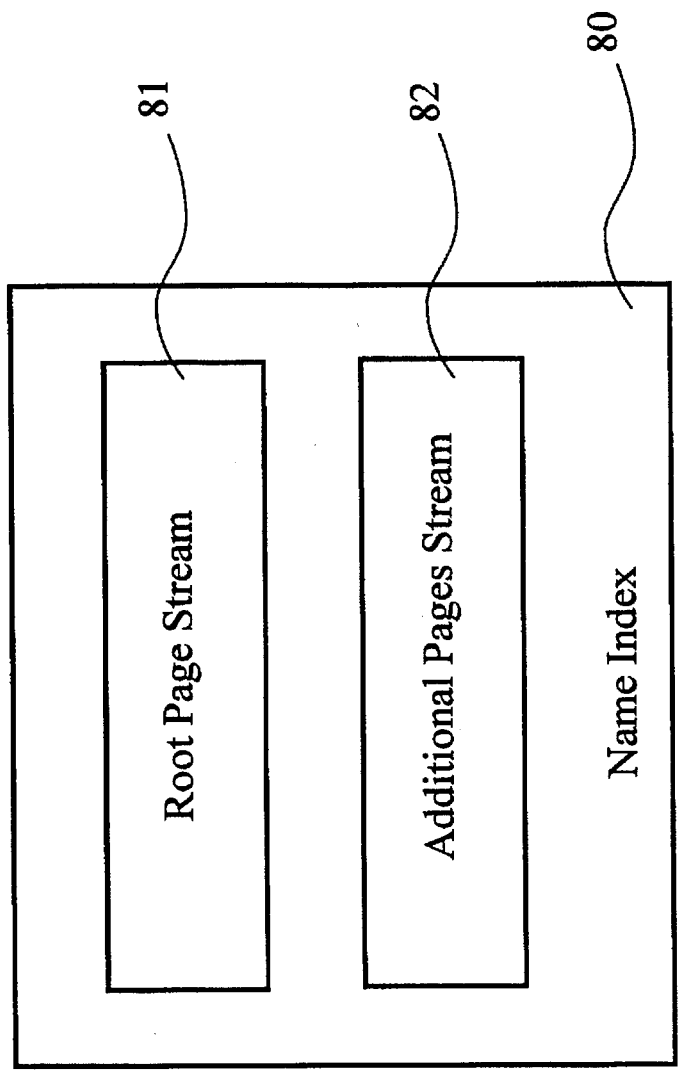
FIG. 8A is a diagram illustrating a name index in accordance with the preferred embodiment of the present invention.

In order to access the streams contained within an onode 40, each onode includes a stream descriptor for a name index 80 that is stored among the streams held in the array of field descriptors 50 (FIG. 4). The name index 80 holds a B-tree index for streams contained within the onode 40. Certain of the less frequently accessed streams are stored directly in the name index 80, whereas more frequently occurring streams are stored in the onode, outside of the name index stream. The name index 80 uses the stream ID of a stream as a key for locating a stream held within the onode. FIG. 8A shows an example of such a name index 80. The stream descriptor for the name index 80 may hold two streams. Stream 81 is for storing the root page of the name index 80. Stream 82 is for storing any additional pages of name index 80. If there are no additional pages, only stream 81 is included in the name index stream descriptor.

Figure 8B:
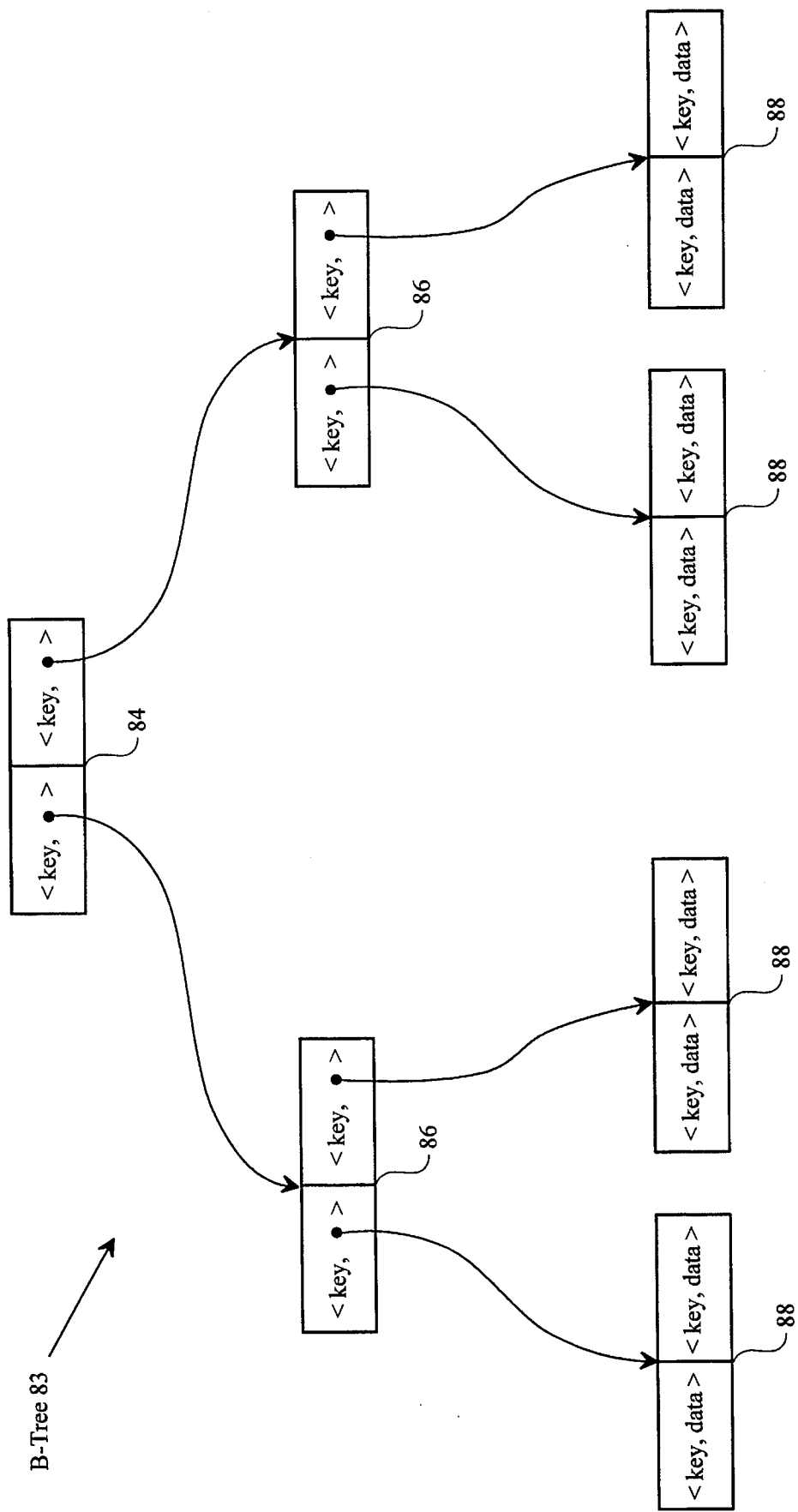
FIG. 8B is an illustration of an exemplary B-tree index that is stored in the name index of FIG. 8A.

FIG. 8B is an example of a B-tree index 83 for the streams of an onode 40 (FIG. 4) that are held in the stream described by a stream descriptor 82. Each stream is indexed based upon its stream ID 36, which uniquely identifies the stream amongst those held in the onode 40. The stream ID constitutes a key value by which data is indexed in the B-tree index 83. The B-tree index 83 of FIG. 8B includes leaf pages 88 and non-leaf pages 84 and 86. Non-leaf page 84 is the root page of the B-tree index 83.

Each leaf page 88 includes a set of pairs of (key value, data). The key value is the stream ID that serves as a key for indexing the data contained within the pair. In the example of FIG. 8B, each leaf page includes two such pairs of key values and data. The number of key value and data pairs that are provided per leaf page 88 generally is larger than two pairs.

The non-leaf pages 86 and 88, likewise, include pairs, but these pairs include key values and a pointer to other pages in the B-tree index 83. The pointers are page numbers that specify a page of disk space occupied by the respective pages 84, 86 and 88. Accordingly, each of the nodes 84, 86 and 88 corresponds to a page of disk space.

The B-tree index 83 provides a quick and efficient approach to access streams within an onode 40 using stream ID as a key value. The key values on the nodes are sorted so that they may be binary searched.

Figure 9:
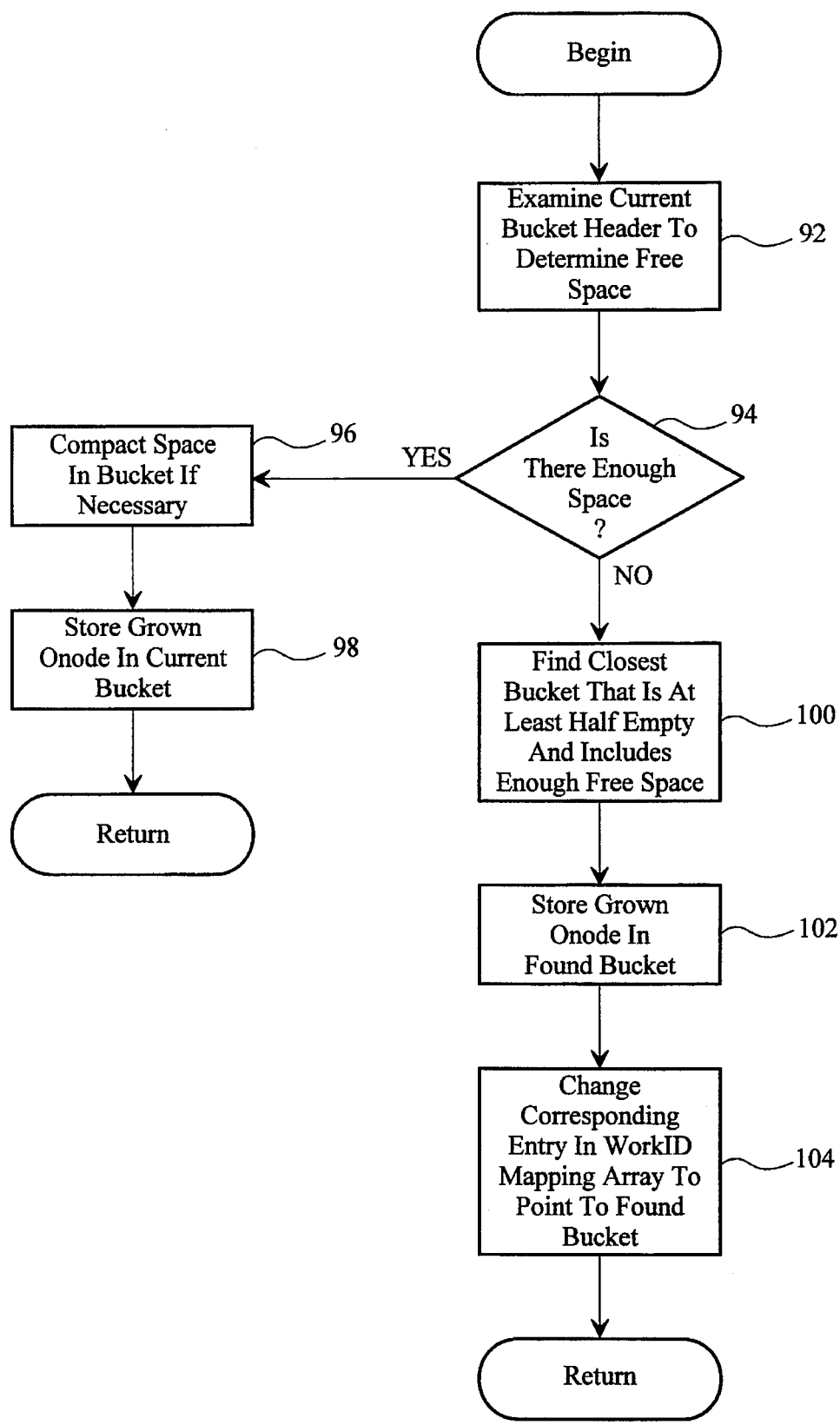
FIG. 9 is a flow chart illustrating the steps performed by the preferred embodiment of the present invention to allocate additional memory space to an onode that is already stored on disk.

Another optimization is provided by facilitating easy growth of onodes 40 within the bucket array 72. FIG. 9 shows a flow chart of the steps performed in determining how to grow an onode 40 (i.e., how to allocate additional memory space for an onode as its memory requirements grow. First, the header of the current bucket that holds the onode is examined to determine the amount of free space in the bucket (step 92). A determination is made if there is enough free space available in the current bucket to store the onode with its added memory requirements (step 94). If their is sufficient space available in the current bucket, the space is compacted if necessary (step 96) and the grown onode is stored in the current bucket (step 98). If, however, the current bucket lacks sufficient free space to store the grown onode, a heuristic is practiced to find the closest bucket (i.e., the closest bucket in terms of physical proximity to the current bucket that is at least half empty and includes enough free space to store the grown onode) (step 100). The grown onode is then stored in this bucket (step 102). The corresponding entry in the work ID mapping array 74 is then updated to point to this bucket (step 104).

While the present invention has been described with reference to a preferred embodiment thereof, those skilled in the art will appreciate that various changes in detail and form may be made without departing from the present invention as defined in the appended claims.

We claim:

1. In a file system in a data processing system having secondary storage divided into sectors, a method of storing contents of files in the secondary storage, comprising the steps of:

providing a sequence of fixed-sized file system data structures of a data type that is specifically designed for storing contents of the files on the secondary storage wherein said fixed-sized file system data structures are distinct from the sectors of the secondary storage;

storing a first set of contents of files that are logically related of a first size in a first variable-sized file system data structure of a given structure type on the secondary storage; and storing the first variable-sized file system data structure of the given structure type in which the first set of contents of files that are logically related are stored in at least one of the fixed-sized file system data structures on the secondary storage.

2. The method recited in claim 1, further comprising the steps of:

storing a second set of contents of files that are logically related of a second size in a second variable-sized file system data structure of the given structure type; and storing the second variable-sized file system data structure of the given structure type in which the second set of contents of files that are logically related are stored in the fixed-sized file system data structure in which the first set of contents of files that are logically related are stored.

3. The method recited in claim 1 wherein the step of providing the sequence of fixed-sized file system data structures further comprises the step of providing a variable-sized array of the fixed-sized file system data structures.

4. The method recited in claim 1 wherein the secondary storage is disk storage.

5. The method recited in claim 1, further comprising the step of storing property information about the first variable-sized file system data structure of the given structure type in the secondary storage.

6. The method recited in claim 5, further comprising the step of querying the first variable-sized file system data structure of the given structure type to obtain the property information stored therein.

7. The method recited in claim 1, further comprising the step of storing an identification in the variable-sized file system data structure of the given structure type that uniquely identifies the first variable-sized file system data structure of the given type stored in the fixed-sized file system data structure.

8. A data processing system, comprising:

internal memory;

secondary storage divided into sectors;

a file system for managing files;

a sequence of fixed-sized file system data structures for storing contents of files wherein said fixed-sized file system data structures are distinct from the sectors of the secondary storage;

means for storing a first set of contents of files that are logically related in a first variable-sized file system data structure of a given structure type; and means for storing the first variable-sized file system data structure in which the first set of contents of files that are logically related are stored in at least one of the fixed-sized file system data structures.

9. A data processing system as recited in claim 8, further comprising:

means for storing a second set of contents of files that are logically related in a second variable-sized file system data structure of the given structure type; and means for storing the second variable-sized file system data structure of the given structure type in which the second set of contents of files that are logically related are stored in the fixed-sized file system data structure in which the first set of contents of files that are logically related are stored.

10. The data processing system of claim 8 wherein the secondary storage is disk storage.

11. The data processing system of claim 8, further comprising means for storing property information about the first variable-sized file system data structure of the given structure type in the secondary storage.

12. The data processing system of claim 11, further comprising means for querying the first variable-sized file system data structure of the given structure type to obtain the property information stored therein.

13. In a file system in a data processing system having secondary storage divided into sectors, a method comprising the steps of:

storing logically contiguous bytes of files in variable-sized data structures of a first type;

storing sets of the variable-sized data structures of the first type in which are stored related files in a variable-sized data structure of a second type; and storing the variable-sized data structure of the second type in a fixed-sized data structure wherein the fixed-sized data structure is independent of the sectors of the secondary storage.

14. The method recited in claim 13 wherein the step of storing logically contiguous bytes of files in variable-sized data structures of the first type further comprises the step of storing an identifier in each data structure of the first type to uniquely identify the logically contiguous bytes stored in the variable-sized structure of the first type among the variable-sized data structures of the first type held in a same one of the variable-sized data structure of the second type.

15. The method recited in claim 13 wherein the secondary storage is disk storage and the step of storing the variable-sized data structures of the second type in a fixed-sized data structures further comprises the step of storing the variable-sized data structures of the second type in fixed-sized data structures in the disk storage.

16. The method recited in claim 13, further comprising the step of storing property information in the secondary storage for each of the variable-sized data structures of the second type.

17. The method recited in claim 16, further comprising the step of querying one of the variable-sized data structures of the second type to obtain the property information contained therein.

18. A data processing system comprising:
    internal storage;
    secondary storage having memory space divided into logical partitions of multiple bytes;
    a file system for managing files;
    means for storing logically contiguous bytes of files in variable-sized file system data structures of a first type in the internal storage;
    means for storing sets of the variable-sized file system data structures of the first type that hold related files in variable-sized file system data structures of a second type in the internal storage; and
    means for storing the variable-sized file system data structures of the second type in fixed-sized data structures in the internal storage.

19. In a data processing system having secondary storage and a file system for managing files, a method comprising the steps of:
    storing sets of logically contiguous bytes of file data in respective variable-sized file system data structures of a first type;
    storing variable-sized file system data structures of the first type which store related files in a variable-sized file system data structure of a second type in the secondary storage; and
    storing a B-tree index to the variable-sized data structures of the first type in the variable-sized file system data structure of the second type in the secondary storage.

20. The method recited in claim 19, further comprising the step of locating logically contiguous bytes of files in the variable-sized file system data structure of the second type in the secondary storage by accessing the B-tree index.

21. The method recited in claim 19 wherein the step of storing the B-tree index to the variable-sized file system data structures of the first type in the variable-sized file system data structure of the second type in the secondary storage further comprises the step of storing the B-tree index to the variable-sized file system data structures of the first type in the variable-sized file system data structure of the second type in the secondary storage as a variable-sized file system data structure of the first type.

22. In a data processing system having secondary storage and a file system for managing files, a method comprising the steps of:
    storing logically contiguous bytes of files in variable-sized file system data structures of a first type;
    storing variable-sized file system data structures of a second type in the secondary storage wherein each variable-sized file system data structure of the second type stores a set of the variable-sized file system data structures of the first type that store files; and
    in each variable-sized file system data structure of the second type, storing a B-tree index to the variable-sized file system data structures of the first type stored in the variable-sized file system data structure of the second type.

23. In a data processing system having a file system for managing files, secondary storage that includes memory space divided into sectors which holds an array of fixed-size buckets file system data structures that are distinct from the sectors and one of the buckets holds an object, a method of allocating additional memory space in the secondary storage to fulfill growing requirements of the object, comprising the steps of:
    determining whether the bucket that currently holds the object has sufficient free memory space to fulfill the growing requirements of the object;
    when the bucket that currently holds the object has sufficient free memory space, allocating additional space in the bucket to the object to fulfill the growing requirements of the object; and
    otherwise, finding a bucket that has sufficient memory space to fulfill the growing requirements of the object and moving the object to the found bucket.

24. The method of claim 23 wherein the step of finding a bucket that has sufficient memory space to fulfill the growing requirements of the object further comprises finding a bucket that has sufficient memory space to fulfill the growing requirements of the object that is in closest proximity in the secondary storage to the bucket that currently holds the object.

25. In a data processing system having secondary storage divided into sectors and a file system for managing files, a method comprising the steps of:
    storing files in an array of fixed-sized buckets of storage space in the secondary storage wherein the buckets are defined by the file system and are distinct from the sector and wherein at least one of the fixed-sized buckets of storage space has more than one file stored in it;
    providing an identifier for each file that identifies the file among those stored in the array;
    storing a map in the secondary storage that maps each identifier for a file into the fixed-sized bucket in which the file is stored;
    locating one of the files having a selected identifier in the array by using the map to locate the fixed-sized bucket in which the file is stored and searching the fixed-sized bucket to locate the file having the selected identifier.

26. In a data processing system having secondary storage that is divided into sectors and a file system for managing files, a method comprising the steps of:
    storing files in array of fixed-sized buckets of storage space in the secondary storage wherein said buckets are defined by the file system and are distinct from the sectors and wherein each file has an identifier associated with it;
    storing a file system mapping structure of multiple entries in the secondary storage, said entries including at least one entry that maps another of the identifiers to one of the buckets in the array;
    storing in the file system mapping structure a free list of identifiers of cells of space in the secondary storage that are unallocated; and using the file system mapping structure to locate a bucket from the identifier of the bucket.

27. The method recited in claim 26, further comprising the step of using the file system mapping structure to locate an identifier in the free list.

28. In a data processing system having secondary storage that is divided into sectors and a file system for managing files, a method comprising the steps of:

provaiding an array of fixed-sized buckets of storage space in the secondary storage wherein said buckets are defined by the file system and are distinct from the sectors and for storing files, each file having an identifier associated with it;

providing a file system mapping structure of multiple entries in the secondary storage for mapping identifiers to either cells in a free list or to the fixed-sized buckets in the array;

providing the free list in the file system mapping structure, said free list including identifiers of any free cells of space in the secondary storage;

determining if the free list contains an identifier for at least one cell; and where the free list contains an identifier for at least one cell, assigning a selected identifier of a cell from the free list to a new file and storing the new file in the cell.

29. The method recited in claim 28, further comprising the step of:

where the free list contains no cells, adding additional entries to the file system mapping structure that map new identifiers to new free cells.

30. The method recited in claim 29, further comprising the steps of:

assigning one of the new identifiers associated with one of the new free cells to the new file; and storing the new file in the new free cell associated with the new identifier that is assigned to the new file.

* * * * *